United States Patent

Petriw

[15] 3,706,938
[45] Dec. 19, 1972

[54] DIRECTIONAL ION ANEMOMETER

[72] Inventor: Andrew Petriw, West Belmar, N.J.

[73] Assignee: The United States of America as represented by the Secretary of the Army

[22] Filed: March 10, 1971

[21] Appl. No.: 122,895

[52] U.S. Cl. ...................... 324/33, 73/194 F, 250/44
[51] Int. Cl. ..................... G01m 27/00, G01m 27/62
[58] Field of Search ........ 73/194 F, 189; 250/43.5 D, 250/44, 45.3 MR; 324/33

[56] References Cited

UNITED STATES PATENTS

| | | | |
|---|---|---|---|
| 2,611,268 | 9/1952 | Mellen | 73/194 F |
| 2,723,349 | 11/1955 | Rylsky | 250/44 |
| 2,632,326 | 3/1953 | Stuart | 73/194 F |
| 3,438,259 | 4/1969 | Bossert | 324/33 |
| 2,861,452 | 11/1958 | Morgan | 63/189 |

*Primary Examiner*—Alfred E. Smith
*Attorney*—Harry M. Saragovitz, Edward J. Kelly, Herbert Berl and Charles F. Gunderson

[57] ABSTRACT

This disclosure relates to anemometers and particularly to ion anemometers. More particularly, this disclosure relates to a directional, ion anemometer where an alpha nuclear radiation source is positioned between two electrodes of opposing polarity in a balanced electrical field. The ion cloud concentration generated by the radiation source is changed by motion of the air to cause a differential voltage or current, between the source and the electrodes, proportional to the wind velocity.

1 Claim, 2 Drawing Figures

PATENTED DEC 19 1972
3,706,938
FIG. 1
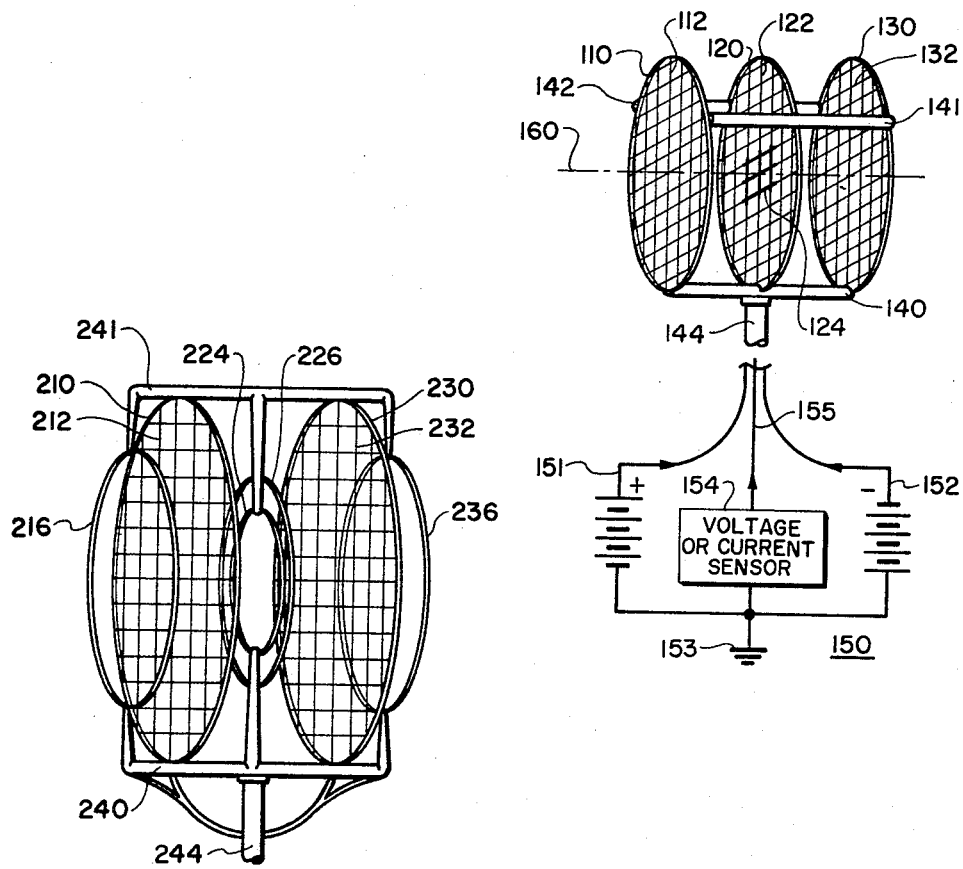
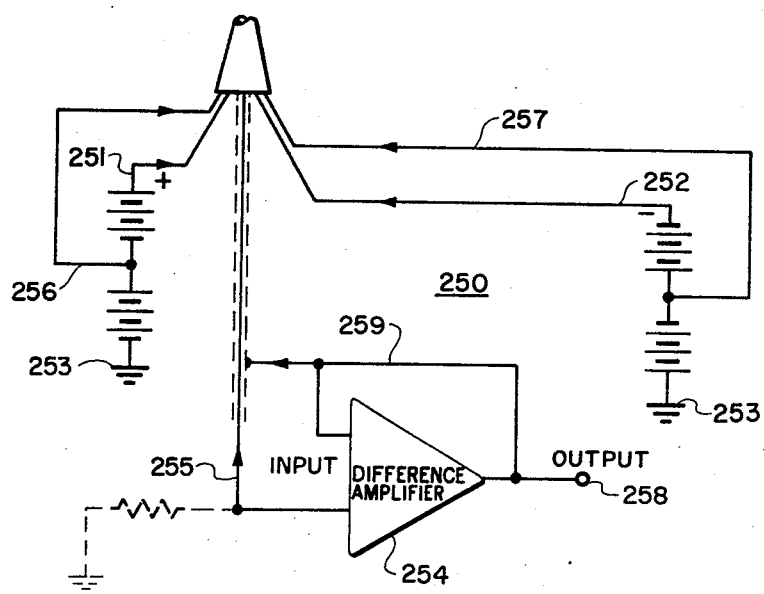
FIG. 2
INVENTOR.
ANDREW PETRIW
BY Charles L. Gunderson
Harry M. Saragovitz,
Edward J. Kelly & Herbert Berl
AGENT
ATTORNEYS.

DIRECTIONAL ION ANEMOMETER

BACKGROUND OF THE INVENTION

Anemometers are very well known and are needed to measure the wind velocity. The most common anemometers are of the cup type, or the propeller with a directional vane. These are relatively simple, electrically and physically, but have inescapable problems of mass and inertia as well as bearing friction. The starting friction limits the response to very low wind velocities and the rotational inertia of the propeller delays the response to sudden changes in wind velocity. Friction also limits the response to the direction of low velocity winds and the inertia, again, delays the response to sudden directional changes.

The thermistor or hot wire types of anemometers can be extremely responsive to changes in wind velocity and the heated elements can be small and very versatile. However, these anemometers have an instability due to temperature and other factors and a complicated calibration and read out system. The hot wire anemometer is very fragile and is unsuitable for field use because of the effects of moisture and airborne chemicals on the probe. The thermistor anemometer is more rugged but slower in response. These types of anemometers become less effective at low velocities where their own induced convections become significant, and they have inherently limited directional capabilities.

Heated-thermocouple anemometers can be made as small as thermistor or hot wire anemometers but these have similar instability; similar calibration and read out problems; similar low velocity problems; and even less inherent directional capabilities.

Pressure plates and drag spheres provide a mechanical pressure proportional to the square of the velocity of the wind. The pressure is, inherently, directional but the plates or spheres are comparatively bulky and, in any case, the magnitude of the wind pressure component becomes unuseable at low velocities.

Acoustical anemometers have a good directional response capability but tend to be limited in accuracy and reliability for low velocity measurements. All of the existing types require very complex and elaborate signal transducing and processing components.

Past efforts to apply the effects of wind on ion current for purposes of anemometry have made use of the ion recombination loss mechanism. To date, however, no useful wind-direction-sensing capability has been achieved with this technique.

It is therefore an object of this invention to provide an anemometer having an extremely low inertia, low mass, and low operating friction. It is a further object of this invention to provide an anemometer that is extremely sensitive, quick acting, and very accurate. It is a further object of this invention to provide an ion anemometer that is directional and particularly sensitive to low velocity winds.

SUMMARY OF THE INVENTION

These objects are accomplished by providing a pair of electrically-conducting, flat, disc-shaped, highly wind-permeable screen electrodes, symmetrically spaced and axially centered on opposing sides of an alpha nuclear radiation source electrode that is also, highly, wind-permeable. The alpha nuclear radiation source ionizes the air in the region between the two outer, screen electrodes, which are charged to opposing voltages with respect to that of the alpha source electrode so as to maintain an equal electric field on both sides of the alpha source electrode. A voltage or current sensor is connected between the alpha source electrode and the midpoint of the voltage source that charges the outer, screen electrodes. Movement of air through the screens in a direction parallel to the axis of the three electrodes produces a space charge unbalance in the ionized region. This unbalance will be proportional to the velocity of the moving air and will be indicated on the voltage or current sensor.

BRIEF DESCRIPTION OF THE DRAWING

FIG. 1 shows an oblique view of one embodiment of this invention; and

FIG. 2 shows an oblique view of another embodiment of this invention.

DETAILED DESCRIPTION OF THE PREFERRED EMBODIMENT

Referring now more particularly to FIG. 1, two, highly wind-permeable, electrically conducting, flat, screen electrodes 112 and 132 have thin, rigid, ring-shaped, metal, supporting frames 110 and 130. A center, wind-permeable, electrically conducting, flat, screen electrode 122 has a thin, rigid, ring-shaped, metal, supporting frame 120. The center electrode 122 also has its central area 124 coated with an alpha nuclear radiation source material. The outer, screen electrodes 112 and 132 are symmetrical about the center electrode 122 and an axis 160. The supporting frames 110, 120 and 130 are held by insulated mounts 140, 141 and 142. A vertical member 144 supports the insulated mounts to hold the device in operating position.

An electrical sensing circuit 150 has a source of positive voltage 151 and a source of negative voltage 152 with respect to a ground potential point 153. A voltage or current sensor 154 has one side grounded and the other side 155 connected to the radiation source electrode 122. The electrodes 112 and 132 are connected to the sources of positive voltage 151 and negative voltage 152, respectively.

In operation, the alpha nuclear radiation source 124 irradiates and ionizes the air around the alpha source electrode 122 and throughout most of the region between the outer electrodes 112 and 132. Due to the presence of the electrical field between electrodes 112 and 132, the negatively charged ions drift from their respective points of origin in the air toward electrode 112 and the positively charged ions drift toward electrode 132. In the absence of wind, the drift velocity of the negative ions equals, approximately, the drift velocity of the positive ions with the result that their steady state populations tend to remain equal. Under this condition, electric field components of the ion space charge neutralize one another with respect to the alpha source electrode 122, and no voltage or current will register on the sensor 154.

In the presence of a wind component parallel to the electric field (or axis 160), this wind velocity component adds vectorially to the drift velocities of the ions. This unbalances the ion populations and their respective electric-field components in proportion to the magnitude of the wind component. This unbalances the voltage or current sensor 154 which may be calibrated in units of wind speed.

In order for the subject ion anemometer to measure wind direction in two or three dimensions, it is necessary to combine a corresponding two or three such ion anemometer units into an orthogonal array, and each unit in the array must exhibit a cosine angular response characteristic that is symmetrical about its axis 160. The functional mechanism of the FIG. 1 anemometer already, inherently, tends to produce a cosine characteristic, while the structural symmetry of the electrodes and the alpha source provides the required response symmetry.

Referring now to FIG. 2, the two, highly wind-permeable, electrically conducting, flat, screen electrodes 212 and 232 have thin, rigid, ring-shaped, metal, supporting frames 210 and 230 and are symmetrical about a center electrode 224 as before. The supporting frames — as well as the additional electrodes of FIG. 2 — are held by the insulated mounts 240 and 241 and the whole structure is mounted on the vertical member 244 as before.

The electronic sensing circuit 250 has a source of positive voltage 251 and a source of negative voltage 252 with respect to ground 253. The source of positive voltage 251 is connected to the electrode 212 and the source of negative voltage 252 is connected to the electrode 232 as before. Tapping points 256 and 257 are provided on the sources of positive and negative voltage respectively.

In FIG. 2, two separate, ring-shaped, alpha-source electrodes 216 and 236 are added symmetrically about the center electrode and outside of the screen electrodes. These alpha-source electrodes 216 and 236 consist of thin, electrically-conducting rings upon which the alpha nuclear radiation source material is coated. By connecting the rings 216 and 236 to voltage supply points 256 and 257 respectively, a large, steady, potential difference is maintained, between the rings 216 and 236 and their adjacent electrodes 212 and 232 respectively, in order to prevent any wind transport of ions into the sensitive volume of the anemometer probe from regions outside.

Three advantages result from this arrangement: First, the external position of the alpha sources offers an efficient means for compensating for any calibration error caused by changes in atmosphere density, e.g., a specific value exists for the distance between the alpha source 216 and electrode 212 and the alpha source 236 and electrode 232 from which a functional compensating effect occurs for the atmospheric density effect; second, a functional aberration, caused by the difference between the mobilities of the positive and negative ions, can be compensated for most efficiently by employing two separate alpha sources of unequal strength; and third, for a given set of performance quality specifications the external position of the alpha sources makes feasible a more compact anemometer probe.

To achieve both a high degree of operating linearity and a good quality of cosine angular response the central, or signal-sensing, electrode 224 is operated as a voltage probe, i.e., electrode 224 is returned to a point of very-high resistance such as the non-inverting input terminal 255 of a very-high-input-resistance difference amplifier 254. Moreover, the relatively small size of the signal-sensing electrode enables it to be operated within the region of most uniform electric field and ionization, while its small, thin, ring shape minimizes any tendency to distort the ion distribution in the sensitive region of the anemometer probe.

In the specie of FIG. 2, the signal-sensing electrode 224 is surrounded by a thin, electrically conducting ring 226 which functions as a guard electrode. This is connected to the inverting input terminal 259 of the difference amplifier 254 and is driven by a low-impedance replica of the signal voltage appearing on electrode 224 and input 255. An appropriate driving voltage for this purpose is available at the output terminal 258 of amplifier 254. The driven, guard electrode circuit serves as an electrical shield, for the signal electrode 224, in lateral directions. This reduces the effective capacity, and increases the effective insulation resistance, of the signal electrode circuit to ground.

In a typical embodiment of this invention, the screen electrodes would have a diameter of 12 centimeters, and be spaced 3 ½ centimeters apart. The supply voltages would be plus 4000 and minus 4000 volts respectively. The alpha-source material is Americium 241 or Polonium 210.

The quantity of alpha source material deposited on the side of the screen electrode 122 facing electrode 112 is about 100 microcuries. The quantity deposited on the side facing electrode 132 is about 130 microcuries. This alpha source disposition serves to correct a minor functional aberration produced by the mobility differences between the positive and negative ions.

The alpha source material may be coated with a thin film of durable inert material such as gold. This should be thick enough to reduce the range of the alpha radiation to about 3 centimeters.

The screen electrodes may be made of wire mesh screen. The thickness of the screen wire, the circular rims of the electrodes, and all of the other structural components of the anemometer probe should be minimal to minimize the aerodynamic cross-section and potential turbulence or deflection of the wind.

We wish it to be understood that we do not desire to be limited to the exact details of construction shown and described, for obvious modifications will occur to a person skilled in the art.

What is claimed is:

1. An ion anemometer comprising an alpha nuclear radiation source material; a first wind-permeable electrode forming a metallic ring of a first diameter; a second wind-permeable electrode forming a metallic screen of a second, substantially-larger diameter, positioned on one side of said first electrode; a third wind-permeable electrode forming a metallic screen of said second diameter, positioned on the other side of said first electrode; a source of positive voltage with respect to ground connected to said second electrode; a source of negative voltage with respect to ground connected to said third electrode; a fourth electrode in the form of a metallic ring of a third diameter larger than said first diameter, said fourth electrode being positioned concentric to said first electrode; an electrical sensor in the form of a difference amplifier having a noninverting input connected to said first electrode, and an inverting input connected to said fourth electrode; a fifth electrode of a fourth diameter connected to a tap on said source of positive voltage; and a sixth electrode of said fourth diameter connected to a tap on said source of negative voltage; said fifth and sixth electrodes being coated with said alpha nuclear radiation source material and positioned adjacent to and outside of said second and third electrodes respectively; said fourth diameter being less than said second diameter.

* * * * *